This application is a continuation-in-part of application, Serial No. 170,555, filed February 2, 1962.

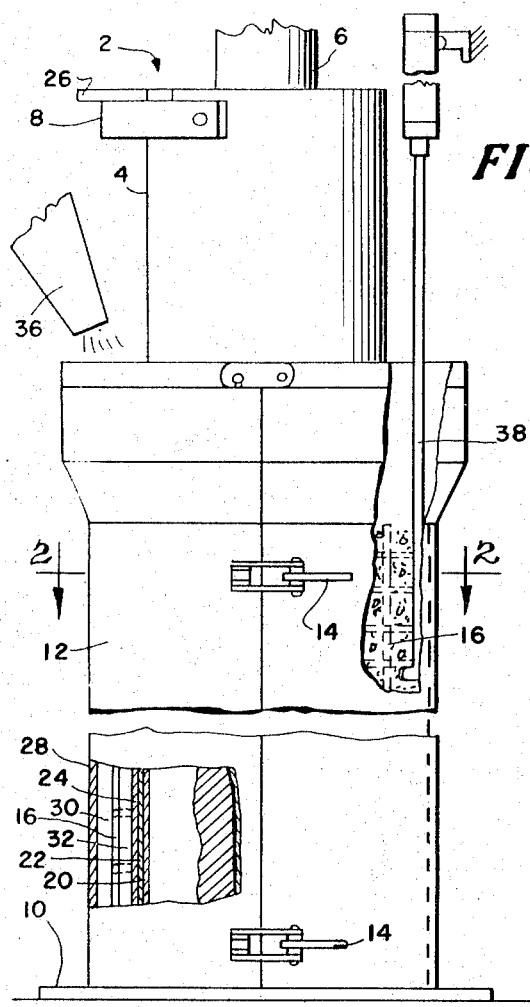
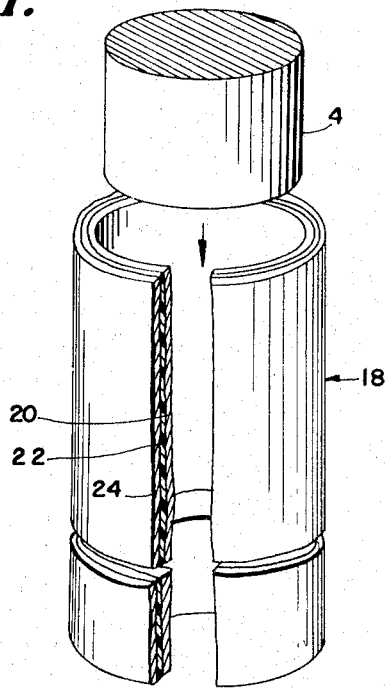
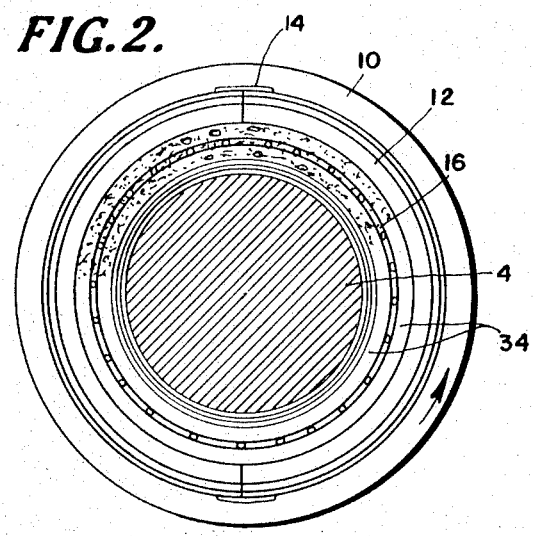
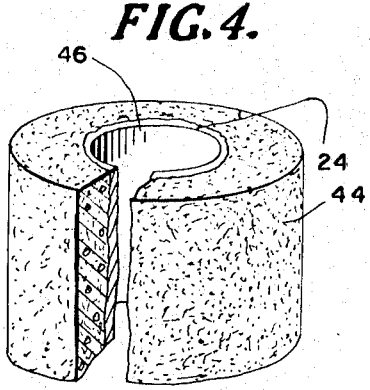
INVENTORS
WILLIAM T. McLAUGHLIN
JOHN R. WEINERT
BY Cushman, Darby & Cushman
ATTORNEYS INVENTORS
WILLIAM T. McLAUGHLIN
BY JOHN R. WEINERT
Cushman, Darby & Cushman
ATTORNEYS 3,297,056
CONCRETE PIPE HAVING A LINER OF AN
EPOXY RESIN-COAL COMPOSITION
William T. McLaughlin and John R. Weinert, Pittsburgh, Pa., assignors, by mesne assignments, to United States Steel Corporation, Pittsburgh, Pa., a corporation of Delaware
Filed Dec. 13, 1963, Ser. No. 330,335
4 Claims. (Cl. 138—145)

This invention relates to the preparation of an integral facing or barrier on the interior surface of concrete pipes.

Concrete pipes are frequently subjected to service conditions which cause attack on the inner surface of the pipe. Thus, hydrogen sulfide (and sulfuric acid formed therefrom) and other agents are released from water and sewage carried by such pipes. As a consequence, the art has turned to vitrified clay in place of concrete in making hydrogen sulfide resistant pipes. Unfortunately, vitrified clay is relatively expensive and does not have as good structural properties as desired, e.g., its compressive strength is not as high as desired.

Concrete pipes further suffer from the disadvantage of having rough, porous interior surfaces and of having inadequate abrasion resistance.

It has been proposed to apply a protective ceramic plate or preformed solid sheet of synthetic resin during the pipe manufacture. The use of ceramic plates has the disadvantage of high cost, both in the cost of the ceramic plates themselves and in their application to the concrete pipe. In some instances the ceramic plate itself can be attacked by corrosive agents. One of the most effective of the plastic sheets is a product known as T-Lock Amer-Plate which consists of a pigmented and plasticized polyvinyl chloride resin sheet having spaced T-shaped protuberances on one side of the sheet for locking into the concrete. While T-Lock Amer-Plate has had some commercial success, it suffers from the disadvantage that it is only intermittent, mechanical locking with the concrete. Also, it must be seamed after application to the concrete.

It is an object of the present invention to prepare a continuous, integral facing (lining) or barrier for the interior surface of concrete pipe.

Another object is to prepare such a facing which is resistant to physical and/or chemical agents which attack concrete itself either by corrosion or erosion.

A further object is to devise an economical way of applying a protective facing to the interior surface of wet or green concrete pipe.

An additional object is to develop an integral facing for the interior surface of concrete pipe to provide a product giving at least as good protection against hydrogen sulfide and sulfuric acid as vitrified clay and which gives a product structurally superior to vitrified clay, e.g., it has better compressive strength.

Yet another object is to impart an abrasion resistant, non-porous, smooth facing to the interior surface of concrete pipe.

It is another object to provide a barrier to bridge and seal cracks or other imperfections, thus giving maximum protection against infiltration or exfiltration through the pipe wall.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by applying a settable epoxy resin composition onto the interior surface of a concrete pipe while the concrete is still in the wet, green or uncured stage. The pipe can be made by any conventional pipe forming machine, such as horizontal centrifugal machines, vertical tamper machines and packer head machines.

The settable epoxy resin composition can be applied by directly impinging the composition onto the wet, uncured surface, e.g. by forcing the composition through a conduit which feeds into a spinning disk inside a wet, uncured concrete pipe. Centrifugal force throws the material against the pipe wall. The spinning disk is gradually retracted through the pipe in order to form a smooth facing or barrier over the entire pipe surface. There is a fusing or integration of the epoxy resin composition facing into the pipe itself.

Alternatively the settable epoxy resin composition adhered (or cohered) to a solid surface or shield can be applied to the inner surface of a concrete pipe while the concrete is still in the wet, uncured stage. Pressure is preferably applied by any convenient means to insure there is penetration of the epoxy composition into the surface of the concrete to give a continuous, integral epoxy facing (lining). The concrete is then allowed to cure in conventional fashion, either at atmospheric temperature or in a steam room. The epoxy resin composition also sets while the concrete cures.

Unless it is desired to use the shield as the final interior corrosion resistant surface, the material of the outer surface of the shield is selected so that the adherence of the set plastic to the cured concrete is stronger than the adherence of the set plastic to the shield in order that the shield can be readily stripped away from the set plastic.

While the epoxy resin can be used alone it has been found much more desirable to incorporate coal tar pitch in the epoxy formulation. It has also been found very desirable to include a finely divided mineral filler such as sand.

The product of the present invention gives as good protection as vitrified clay and is structurally superior thereto. The conduit formed is not only resistant to hydrogen sulfide and sulfuric acid, but is abrasion resistant and presents a smoother surface than conventional concrete which has a rough texture. Surprisingly, the epoxy resin mastic bonds to the wet, uncured concrete.

The invention will be best understood in connection with the accompanying drawings wherein:

FIGURE 1 is a vertical elevation partially broken away of a tamper machine for use according to the invention;

FIGURE 2 is a view along the line 2—2 of FIGURE 1 after the concrete has been poured;

FIGURE 3 is a vertical view partially broken away in section showing one form of the invention;

FIGURE 4 is a fractional perspective view partially broken away and in section showing a cured concrete pipe having an integral, continuous interior liner according to the invention;

Figure 5:
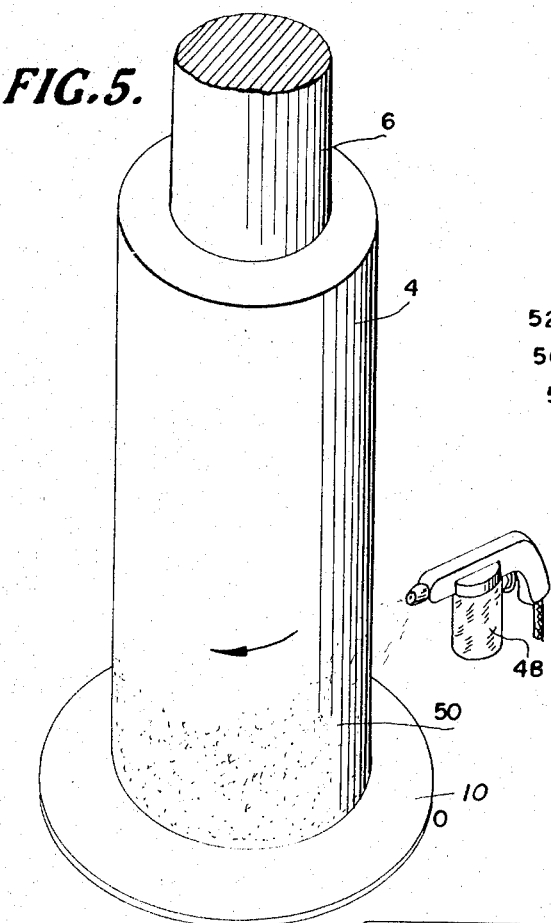
FIGURE 5 is a vertical elevation of an alternative method of carrying out the invention.

There are numerous procedures for carrying out the invention. Several of these processes are described in further detail infra.

(1) The settable plastic can be applied directly to, e.g., sprayed on, the steel core of the concrete pipe forming machine prior to the pipe forming operation. The core preferably has a coating of a mold release agent. This procedure has the disadvantage as compared with some of the other procedures of the invention of tying up the pipe making machine for considerable periods of time and also requires that the core be cleaned. Additionally, it is more difficult to obtain a smooth surface on the liner by this procedure than by procedures 2, 3 or 4.

(2) The settable plastic can be applied to a shield which has been previously removably secured to the core of the pipe forming machine. The concrete pipe is then formed. Either before or after formation of the pipe, the shield is detached from the core and after formation the concrete pipe-plastic liner and shield are removed from the machine and the concrete allowed to cure. After the concrete has cured, the shield is peeled away from the set liner which now adheres to the concrete. This procedure has the disadvantages of procedure 1 except that the core need not be cleaned. In procedure 1 and in one means of operating procedure 2 utilizing the temper machine the core is rotated during the pipe forming operation.

(3) The settable plastic is applied to the shield off the pipe forming machine. The shield can then be placed on the pipe forming machine in the manner described below. This is the preferred procedure. Preferably, the core is not rotated in procedure 3 when utilizing a damper machine.

A modified procedure 3a can be utilized to apply the integral liner to concrete pipe made by a centrifugal horizontal machine (as well as pipe made by vertical machines). In the modified procedure the concrete pipe is first formed by the machine. While the pipe is still wet and green, i.e., uncured, the shield containing the settable plastic lining material is placed inside the pipe. Then pressure is applied to the interior surface of the shield, e.g., by an expandable mold, to force the settable plastic into integral, continuous contact with the inner surface of the concrete pipe, and the pipe is allowed to cure and the plastic to set. The shield is then peeled from the plastic liner which now is integrally and continuously united to the concrete pipe surface.

(4) A preformed liner of any desired polymer (resin or rubber) has applied thereto a surface activating coating, i.e., a settable plastic, of the same or different material which will bind to the concrete. The procedure followed is then the same as in procedure 3 except that the preformed liner (shield) is not removed from the concrete pipe-set plastic surface. This method is suitable for making laminate liners integrally and continuously united to the interior surface of concrete pipe. Procedure 4 can be modified in a manner similar to procedure 3a.

(5) The settable plastic, i.e. epoxy resin formulation, e.g. a mixture of coal tar pitch, epoxy resin and sand is charged into a cartridge which via a conduit feeds into a spinning disk. This assembly is lowered inside a wet, uncured concrete pipe. Material is extruded out of the cartridge onto the disk. Centrifugal force throws the material against the pipe wall as the assembly is gradually raised through the center of the stationary pipe. This procedure is disclosed more full in McLaughlin and Clancy application, Serial No. 330,416, filled December 13, 1963, entitled "Facing of Concrete Pipe."

In a modification of procedure 5 the sand can be fed separately from the epoxy resin-coal tar pitch and the two streams integrated at any time prior to application to the pipe wall.

Unless otherwise indicated, all parts and percentages are by weight.

In the illustrative examples described in connection with the drawings the settable plastic employed had the following composition:

| | Parts |
|---|---|
| Liquid bisphenol A-epichlorhydrin having an epoxy equivalent of about 200 and a molecular weight of about 400 | 2.50 |
| Butylglycidyl ether (to reduce the viscosity) | 0.13 |
| Diethylene triamine (catalyst) | 0.20 |
| Pitch-containing coal tar specifically road tar 5(RT 5) | 5.17 |
| Sand (filler) all passed through 30 mesh and substantially all retained on 200 mesh (Tyler screen) | 24.0 |

This composition is designated hereinafter as Composition A.

While Composition A was employed in the specific example described below, there can be employed in place of Composition A, Composition B or C with equally effective results.

*Composition B*

| | Parts |
|---|---|
| Liquid bisphenol A-epichlorhydrin having an epoxy equivalent of about 200 and a molecular weight of about 400 | 2.63 |
| Diethylene triamine (catalyst) | 0.20 |
| Pitch-containing coal tar, specifically road tar 6(RT 6) | 5.17 |
| Sand (filler) all passed through 20 mesh and substantially all retained on 200 mesh (Tyler screen) | 24.0 |

*Composition C*

| | Parts |
|---|---|
| Liquid bisphenol A-epichlorhydrin having an epoxy equivalent of about 250–280 and a molecular weight of about 500–560 | 2.50 |
| Butyl glycidyl ether (to reduce the viscosity) | 0.13 |
| Diethylene triamine (catalyst) | 0.20 |
| Pitch-containing coal tar, specifically road tar 6(RT 6) | 5.17 |
| Sand (filler) all passed through 30 mesh and substantially all retained on 200 mesh (Tyler screen) | 24.0 |

Referring more specifically to FIGURES 1–4 and 7 there is provided a tamper type concrete pipe forming machine 2. The pipe forming machine 2 includes a highly polished steel core 4 which is attached to shaft 6. The latter, in turn, is connected to any suitable power source, such as an electric motor, for raising and lowering the core 4. Attached to the top of the core 4 is a bell former 8. The pipe forming machine 2 also includes a platform 10 adapted for rotation. The platform 10 is connected to any suitable means, e.g., an electric motor (not shown). A cylindrical piper form or mold 12 is positioned on the platform 10. The pipe form is of conventional split mold construction. The pipe form or mold can be subsequently removed from the formed concrete pipe in either cured or uncured condition by operating the handles 14 to open the mold.

After the pipe form 12 is placed on the platform 10, the cylindrical reinforcing cage 16 (made of an iron lattice) is positioned inside the pipe form. A cylindrical, free standing transfer medium or shield 18 is inserted inside the cage. The shield has an internal diameter such that the core 4 will closely fit inside it. The shield is made of a layer of kraft paper board 20 having a thin protective coating of wax on its inside surface to act as a moisture barrier. The outer surface of the kraft paper board is laminated to a 2 mil thick film of polyethylene 22. The outer surface of the polyethylene film is coated with Composition A to form a layer 24 having a thickness of 3/32 of an inch. Composition A can be applied to the polyethylene by spraying, trowelling or other conventional technique.

The core 4 is then lowered into the pipe form 12 until the plate 26 attached to bell former 8 is in close proximity with the top of the pipe form.

At this point in the process the various pipe and liner media are in the following relative positions indexed from the exterior inward: wall 28 of the pipe form, open annular space 30, wire reinforcement cage 16, open annular space 32, coated shield 18 and core 4. With the core 4 locked in a stationary position, the pipe form 12 is rotated as indicated by the arrow. Concurrently, wet concrete 34 is added via chute 36 and tamper 38 driven by a motor (not shown) is activated. Tamper 38 operates between the outside of the cage 16 and the inner wall of the pipe form 12. The tamper gradually rises in conventional fashion as the pipe form is filled with concrete. The tamper applies pressure to the wet concrete which aids in forcing the concrete into intimate, interlocking contact with the coating on the shield. The shield is so designed as to allow free movement around the stationary core, thus preventing damage from the rotational shear forces to the mastic Composition A which is to form the liner for the pipe. Filling and tamping of the concrete mix continues until the form is filled and the pipe socket 40 is formed. Then, as in conventional concrete pipe forming procedure, the core is lifted from the pipe form and finished pipe, the shield and mastic liner are allowed to remain affixed to the interior pipe wall 42. Following removal of the pipe form from the pipe machine, the lined, uncured pipe, still encased in the form, is placed in a steam curing chamber, the pipe form stripped off and the uncured, lined pipe put through the regular steam cure period, e.g., about 100° F. for 24 hours. (As stated above, curing can also be accomplished under normal atmospheric conditions.) Following the steam cure, the shield is stripped from the inner wall of the pipe and, as shown in FIGURE 4, the protective facing 24 made from set Composition A is a smooth, integrally formed, continuously bonded protective interior wall 46 for the cured concrete pipe 44. As can be seen in FIGURE 4, the protective facing in the forming period has been forced into the surface of the concrete to fill the pores therein. The irregularities normally present in the concrete surface are eliminated.

Figure 7:
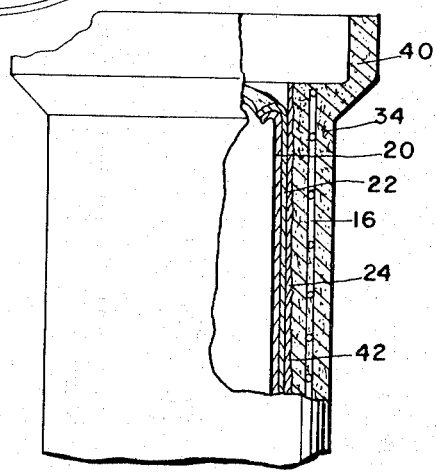
FIGURE 7 shows a cured concrete pipe according to the invention prior to removal of the shield.

Procedure 1 set forth above is illustrated by FIGURE 7 shows the shield being pulled away at the top from the facing which is now integrally united to the cured concrete pipe.

Procedure 1 set forth above is illustrated by FIGURE 5. In this method the surface of the highly polished steel core is preferably treated with a thin film of a release agent, e.g., paraffin wax (although the release agent can be omitted). Then the core 4 is sprayed to approximately 3/32 inch thickness with Composition A from spray gun 48. The sprayed-on composition is designated at 50. The pipe form 12 and wire cage 16 are then positioned on platform 10 in the manner previously described in connection with FIGURE 1 and the core is positioned on the platform inside the cage. The wet concrete is then poured with or without tamping, although the latter is preferred and the pipe is produced. The core is allowed to rotate along with the pipe form and cage during the concrete pouring operation. This is essential in this form of the invention to prevent the mastic Composition A from being dispersed throughout the concrete rather than forming the desired inner facing. Upon completion of the pour, the core is locked to prevent rotation and the core is withdrawn. During the withdrawal, the formed pipe, protective Composition A and pipe form continue to rotate. The lined pipe is then cured in conventional fashion, e.g., by steam curing as described above.

Figure 6:
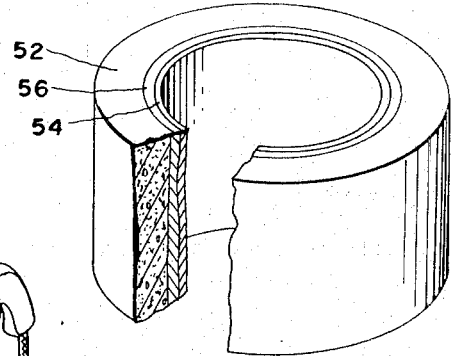
FIGURE 6 shows a plural layer of laminate integral, continuous lining for the interior surface of a concrete pipe.

FIGURE 6 shows a portion of a finished concrete pipe having an integral, continuous laminated liner. This type of protected pipe can be prepared by the procedure described in connection with FIGURE 1 except that in place of using a polyethylene coated kraft paper board shield there is provided a shield made of a solid polymer which will adhere strongly to the mastic composition and thus form a protective facing for the concrete. Thus, in FIGURE 6 the finished concrete pipe 52 is laminated to a phenolformaldehyde polymer liner 54 (or shield) by set Composition A layer 56. The set Composition A not only is integrally and continuously united to the concrete pipe but also adheres strongly to the polymer liner.

In another example Composition A was fed via a conduit into a disk spinning at 2800 r.p.m. inside a wet, uncured 24 inch concrete pipe. The material was impinged by centrifugal force against the inner pipe wall and impregnated the surface thereof and formed a contiguous smooth facing 110 mils thick on the wall.

While the thickness of the facing was 110 mils in the specific examples and usually is between 100 and 125 mils, this can be varied widely. Thus facings as thin as 10 mils or as thick as 300 or 400 mils or more can be formed on the wet, uncured concrete.

The epoxy resins which can be used include the epoxy ether resins having a 1,2-epoxy equivalency of greater than 1, such as the reaction products of polyhydric alcohols or polyhydric phenols with epichlorhydrin or glycerol chlorhydrin. Examples of such resins are the polyglycidyl ethers of resorcinol, catechol, hydroquinone, bis-(4-hydroxyphenyl)-2,2-propane (bis-phenol A), 4,4'-dihydroxy-benzophenone, bis-(4-hydroxyphenyl)-1,1-ethane, tetrakis (4-hydroxyphenyl)ethane, bis-(4-hydroxyphenyl)-1,1-isobutane, bis-(4-hydroxyphenyl)-2,2-butane, bis-(4-hydroxy-2-methylphenyl)-2,2-propane, bis-(4-hydroxy-2-t-butylphenyl)-2,2-propane, bis-(2-hydroxynaphthyl)-methane, 1,5-dihydroxy-naphthalene, ethylene glycol, propylene glycol, trimethylene glycol, diethylene glycol, triethylene glycol, glycerol, dipropylene glycol, diglycerol, erythritol, mannitol, sorbitol, polyallyl alcohol, polyvinyl alcohol, novolak resins, e.g., the novolak from 4 moles of phenol and 3 moles of formaldehyde, as well as other novolaks having 3 to 7 phenolic nuclei, phloroglucinol, 2,4,4'-trihydroxy diphenyl dimethyl methane, 4,4'-dihydroxy diphenyl sulfone and 4,4'-dihydroxy biphenyl. There can also be used other epoxy resins and resin formers having a 1,2-epoxy equivalency of greater than 1 including polymeric butadiene dioxide, diglycidyl ether, allyl glycidyl ether, glycidyl methacrylate, glycidyl ester of trimerized linoleic acid, diglycidyl ester of dimerized linoleic acid, Oxiron 2000 (an epoxidized polybutadiene-partially hydrolyzed vinyl acetate copolymer having a viscosity of 1800 poise, an epoxy equivalency of 177, having 2.5% hydroxyl and an iodine number of 185).

While straight epoxy resins can be employed, preferably the epoxy resins are modified with a bituminous material, most preferably, a coal tar pitch-containing material. The bituminous materials include coal tar pitch, refined coal tar, coal tar (which contains coal tar pitch together with more volatile organic materials), coal tar fractions, such as RT-5 and RT-9 (road tars), phenolic pitch, petroleum pitch, aromatic petroleum pitches, pyrobitumen, straight run, blown, cracked, aromatic and polymerized asphalts, extract bitumen and pine tar. The preferred aromatic petroleum pitches are alkyl substituted polynuclear aromatic hydrocarbons having a high degree of alkylation, the alkyl groups in general having short chains, i.e. essentially not over propyl. Such aromatic petroleum pitches usually have a boiling range of 480–1000° F. an aromatics content of over 90% and a paraffin of less than 8%, usually less than 6% and infrared indexes measured at 3.3 to 3.4 microns of between 0.70 and 1.00. Typical commercial aromatic pitches in this category are an aromatic petroleum pitch available from Monsanto and having an infrared index of 0.91 and Atlantic 100 resin having an infrared index of 0.74.

It has also been found that coal can be used in place of the coal tar pitch. Either anthracite or bituminous coal can be used with the bituminous coal being preferred. The coal is normally ground to 20 mesh or less.

Generally 5 to 95 parts of bituminous material, e.g. pitch or coal are used with 95 to 5 parts of epoxy resin.

Normally, there is also added 0.05 to 1 part of a curing agent per part of epoxy resin. Typical curing agents include diethylene triamine, triethylene tetramine, dicyandiamide, melamine, triethanolamine, N,N-dibutyl-1,3-propane diamine, amide from dimerized linoleic acid and ethylene diamine phosphoric acid, aluminum chloride and other Friedel-Crafts catalysts, oxalic acid, phthalic anhydride, etc.

There can also be added any of the conventional fillers, such as sand, coal, talc, mica, blast furnace slag, silica, clays, e.g., kaolin and bentonite, lignin, aluminum oxide, iron oxide, cement, silicon carbide, asbestos, diatomaceous earth, glass fibers. The filler can be from 1 to 90% of the total composition. Desirably, sufficient filler, preferably a silica filler such as sand, is used to make a mastic composition. Preferably, 25 to 85% of finely divided inorganic filler is employed. The filler is preferably less than 20 mesh (Tyler screen). The preferred fillers are finely divided mineral fillers, e.g., sand.

There can also be added a thixotropic agent such as Cab-O-Sil (a flame hydrated silica) or Bentone 34 (dimethyl dioctadecyl ammonium bentonite).

While the concrete pipe normally has the reinforcing wire therein, this can be omitted if desired.

The settable plastic, as used in the invention, is normally applied in a sticky or mastic condition.

In the examples the pitch can be omitted, and the filler can also be omitted so that only the epoxy resin is impinged on the interior pipe wall to form the coating. Preferably, however, an aromatic pitch, such as coal tar pitch, is included in the formulation and, as previously stated, there is also preferably included sand or equivalent finely divided mineral filler to impart a mastic consistency and abrasive resistant quality to the composition.

Epoxy ether resins, particularly bis-phenol A-epichlorhydrin, are the preferred resins, although other vic-epoxy resins, i.e., oxirane group containing resins, can be used, as previously indicated.

When a shield such as shield 54 is employed it can be made of a set epoxy resin of the type previously set forth.

The shield can also be made of a set polyester resin, e.g. a resin made from an unsaturated polyester and a polymerizable ethylenically unsaturated monomer. The polyester can be made from glycols such as ethylene glycol, diethylene glycol, propylene glycol, dipropylene glycol, 2,3-butanediol, 1,3-butanediol, tetrachlorobutanediol-1,4, trimethylene glycol and unsaturated dibasic acids (and their anhydrides if available) such as maleic acid, fumaric acid, hexachloroendomethylene tetrahydrophthalic acid, cis-3,6-endomethylene-delta, 4-tetrahydrophthalic acid, itaconic acid and citraconic acid. A portion of the unsaturated acid can be replaced by saturated aliphatic or aromatic polycarboxylic acids such as succinic acid, adipic acid, sebacic acid, azelaic acid, phthalic acid, tetrachlorophthalic acid, trimesic acid, hemimellitic acid and citric acid. As the ethylenically unsaturated monomer there can be used styrene, the vinyl toluenes, e.g., p-vinyl toluene, alpha-methyl styrene, triallyl cyanurate, diallyl phthalate, methyl methacrylate, ethylene glycol dimethacrylate, vinyl acetate, o-chlorostyrene. A specific example of a polyester is polyethylene glycol-polypropylene glycol-adipate-maleate modified with styrene.

Likewise the shield 54 can be made from polyurethanes, e.g., the reaction products of an organic polyisocyanate such as toluene diisocyanate, phenylene diisocyanate, naphthalene diisocyanate and hexamethylene diisocyanate with a polyhydric alcohol or polyester having free hydroxyl groups. Specific examples of such polyurethanes are made by reacting toluene diisocyanate (a mixture of 80% of the 2,4-isomer with 20% of the 2,6-isomer) with a polyester such as an ethylene glycol-adipate having a hydroxyl number of about 440 and an acid number of about 1.5 or with a polyhydric alcohol such as LG-56 (glycerol-propylene oxide adduct having a molecular weight of 3000), polypropylene glycol having a molecular weight of 2025, tris dipropylene glycol phosphite, 1,2,6-hexane triol-propylene oxide adduct, molecular weight 1000, tris polypropylene glycol 2025 phosphite, a mixture of polypropylene glycol 2025 and tris dipropylene glycol phosphite.

The shield also can be made from other cured or thermoset resins such as alkyd resins, e.g. glyceryl phthalate, phenolic resins, e.g., phenol-formaldehyde, cresol-formaldehyde, phenol-furfural, xylenol-formaldehyde, resorcinol-formaldehyde, aminotriazine-aldehyde resins, e.g., melamine-formaldehyde, urea-formaldehyde, polymerized triallyl cyanurate, dicyandiamide, diethylene glycol bisallyl carbonate, diallyl phthalate partial polymer, furane resins, e.g., polymerized furfuryl alcohol, furfuryl alcohol-furfural copolymer, furfuryl alcohol-urea-formaldehyde, and oxetane resins such as polymers of 3,3-dichloromethyl oxetane.

To make the shield 54 there can be used thermoplastic resins including vinyl resins such as polystyrene, polyethylene, polypropylene, acrylonitrile-butadiene-styrene, polyvinyl chloride, vinyl chloride-vinyl acetate copolymer, resinous polyoxymethylyene (Delrin), polycarbonates, e.g., bisphenol-A-polycarbonate (made from diphenyl carbonate and bisphenol-A), polyethylene terephthalate, polyamides and polyester amides of the nylon type, e.g., polymeric hexamethylene adipamide, vinylidene chloride resins (Saran), e.g., copolymer of 75% vinylidene chloride and 25% acrylonitrile, Teflon (polytetrafluoroethylene), Kel-F (polychlorotrifluoroethylene), glass, vitrified clay, porcelain, thin gauge metal or rubbery materials such as natural rubber, butadiene-styrene copolymer, butadiene-acrylonitrile copolymer, Butyl rubber (e.g. isobutylene-isoprene copolymer).

The shield or transfer medium 18 can be made of metal sheet, e.g., steel, paper, fiber board, cloth or solid resin or elastomer. The release surface 22 can be polyethylene, polypropylene, Mylar (polyethylene terephthalate) or any other smooth surface to which the settable plastic does not have as strong an adherence as is does to the cured concrete pipe.

As previously set forth, there can also be employed a release agent on the core 4 when no shield is employed. Such release agent can be a wax, polyethyl acrylate, a silicone (e.g., polymerized dimethyl siloxane). Such release agents can also be employed with the shield in place of the polymer surface or in some instances can be used on top of the polymer, e.g., polyethylene, surface.

For many uses it is preferred that either no shield is employed or the shield is removed to expose the facing of epoxy resin composition.

While it is preferable to employ concrete there can be utilized more expensive but equivalent materials such as the hydraulic cements, e.g., Portland cement and magnesium oxychloride cement.

It may be noted, as is well known by those skilled in the art, that in forming concrete pipe, e.g., by a vertical machine as described in the present application, there is a tendency for the aggregate to go to the center and for the portion of the pipe which forms the inner and outer surfaces to be made up essentially of the cement fraction of the concrete, i.e., the center of the pipe is rich in aggregate whereas the surfaces are rich in cement.

While the present invention is primarily concerned with lining the inner surface of a concrete pipe, it can also be employed to line the outer surface of a concrete pipe. In such instance the shield rather than being placed inside the cage and adjacent the core as shown in FIGURE 1 would be placed outside the cage adjacent the mold form.

Figure 8:
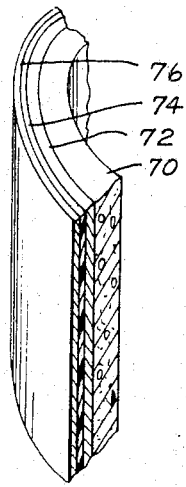
FIGURE 8 is a perspective view partially broken away showing the application of a settable plastic to the outside surface of a pipe.

After positioning the shield having an internal coating of the coal tar epoxy mastic, the concrete is then poured in the same manner as described in connection with FIGURE 1. The resulting product prior to removal of the shield is shown in FIGURE 8 wherein pipe 70 has an external coating of coal tar-epoxy 72 which, in turn, is adhered to the shield comprising polyethylene layer 74 and kraft paper backing 76. After the pipe is cured and the plastic set, the shield is readily removed in the manner which has previously been indicated.

When the shield is placed adjacent the mold form, the tamping device 38 can either be dispensed with or placed inside the cage. If the tamping device is positioned adjacent the shield, there is the danger that it will pull off some of the settable plastic.

We claim:

1. A concrete pipe having an integral liner for the inner surface thereof of a cured epoxy resin composition also including coal, said epoxy resin composition having been applied to the inner surface of the concrete pipe while the concrete was still in the wet, uncured stage and said resin was in the settable stage.

2. A concrete pipe according to claim 1 wherein the coal is bituminous coal.

3. A concrete pipe according to claim 1 including a finely divided mineral filler.

4. A concrete pipe according to claim 1 wherein the epoxy resin is a diphenylol propane-epichlorhydrin resin and there is included in epoxy resin composition 5 to 95% of a coal filler based on the total of resin and filler.

References Cited by the Examiner
UNITED STATES PATENTS

| | | | |
|---|---|---|---|
| 1,636,367 | 7/1927 | Illemann | 138—145 X |
| 2,120,309 | 6/1938 | Carson | 138—145 X |
| 2,243,273 | 5/1941 | Edwards | 138—140 |
| 2,765,288 | 10/1956 | Whittier et al. | 260—28 |
| 2,906,720 | 9/1959 | Simpson | 260—28 |

SAMUEL ROTHBERG, *Primary Examiner.*

EDWARD V. BENHAM, LAVERNE D. GEIGER, *Examiners.*

C. HOUCK, *Assistant Examiner.*